United States Patent
Rondon et al.

(10) Patent No.: US 9,555,615 B2
(45) Date of Patent: Jan. 31, 2017

(54) ABLATION-TYPE LITHOGRAPHIC IMAGING WITH SILICONE ACRYLATE LAYERS

(71) Applicants: Sonia Rondon, Nashua, NH (US); Kevin Ray, Windham, NH (US)

(72) Inventors: Sonia Rondon, Nashua, NH (US); Kevin Ray, Windham, NH (US)

(73) Assignee: Presstek, LLC, Hudson, NH (US)

( * ) Notice: Subject to any disclaimer, the term of this patent is extended or adjusted under 35 U.S.C. 154(b) by 746 days.

(21) Appl. No.: 13/937,588

(22) Filed: Jul. 9, 2013

(65) Prior Publication Data

US 2013/0298793 A1  Nov. 14, 2013

Related U.S. Application Data

(63) Continuation of application No. 12/783,985, filed on May 20, 2010.

(51) Int. Cl.

| | | |
|---|---|---|
| *G03F 7/00* | (2006.01) | |
| *B41F 7/02* | (2006.01) | |
| *B41C 1/10* | (2006.01) | |
| *C08J 7/18* | (2006.01) | |
| *C09D 183/06* | (2006.01) | |
| *C08G 77/20* | (2006.01) | |

(52) U.S. Cl.
CPC ............... *B41F 7/02* (2013.01); *B41C 1/1033* (2013.01); *C08J 7/18* (2013.01); *C09D 183/06* (2013.01); *B41C 2201/02* (2013.01); *C08G 77/20* (2013.01); *C08J 2483/04* (2013.01); *C08L 2312/06* (2013.01); *Y10T 428/31663* (2015.04)

(58) Field of Classification Search
CPC ........................................................ B41F 7/02
See application file for complete search history.

(56) References Cited

U.S. PATENT DOCUMENTS

| | | | |
|---|---|---|---|
| 4,533,566 A | 8/1985 | Evans et al. | |
| 5,260,350 A | 11/1993 | Wright | |
| 5,310,869 A * | 5/1994 | Lewis | C08L 83/04 430/272.1 |
| 5,494,945 A | 2/1996 | Kidon et al. | |
| 6,074,797 A | 6/2000 | Suezawa et al. | |
| 2003/0186013 A1 | 10/2003 | Dhaler et al. | |
| 2008/0182135 A1* | 7/2008 | Murayama | G11B 5/738 428/840.2 |
| 2010/0075250 A1 | 3/2010 | Iihara et al. | |
| 2010/0239976 A1* | 9/2010 | Rondon | B41C 1/1016 430/270.1 |

FOREIGN PATENT DOCUMENTS

| | | | |
|---|---|---|---|
| JP | 2004089862 | | 3/2004 |
| JP | 2004089862 A | * | 3/2004 |
| WO | WO-99/019371 | | 4/1999 |

OTHER PUBLICATIONS

English Machine Translation from JPO for JP2004089862 (2004).*

* cited by examiner

*Primary Examiner* — Chanceity Robinson
(74) *Attorney, Agent, or Firm* — Morgan, Lewis & Bockius LLP

(57) ABSTRACT

In ablation-type printing plates involving silicone acrylate top layers, curing at high oxygen levels not only substantially reduces or eliminates toning, but does not adversely affect plate durability or printing performance.

7 Claims, 1 Drawing Sheet

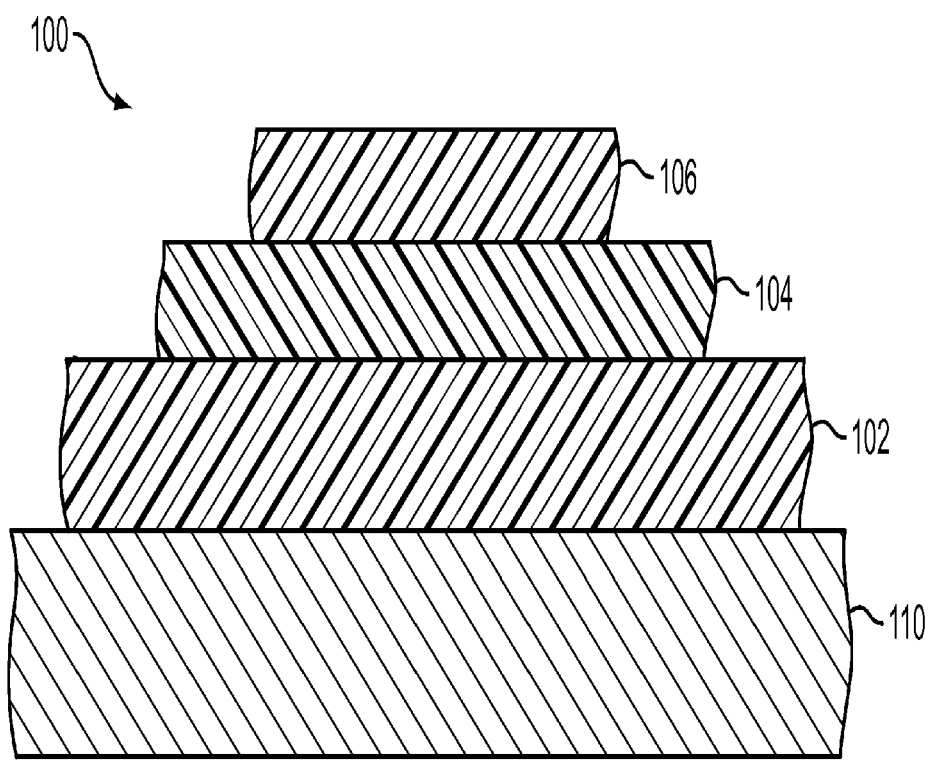

ABLATION-TYPE LITHOGRAPHIC IMAGING WITH SILICONE ACRYLATE LAYERS

RELATED APPLICATIONS

This application is a continuation of and claims priority to U.S. patent application Ser. No. 12/783,985, filed on May 20, 2010, the disclosure of which is hereby incorporated by reference in its entirety.

BACKGROUND OF THE INVENTION

In offset lithography, a printable image is present on a printing member as a pattern of ink-accepting (oleophilic) and ink-rejecting (oleophobic) surface areas. Once applied to these areas, ink can be efficiently transferred to a recording medium in the imagewise pattern with substantial fidelity. Dry printing systems utilize printing members whose ink-repellent portions are sufficiently phobic to ink as to permit its direct application. In a wet lithographic system, the non-image areas are hydrophilic, and the necessary ink-repellency is provided by an initial application of a dampening fluid to the plate prior to inking. The dampening fluid prevents ink from adhering to the non-image areas, but does not affect the oleophilic character of the image areas. Ink applied uniformly to the printing member is transferred to the recording medium only in the imagewise pattern. Typically, the printing member first makes contact with a compliant intermediate surface called a blanket cylinder which, in turn, applies the image to the paper or other recording medium. In typical sheet-fed press systems, the recording medium is pinned to an impression cylinder, which brings it into contact with the blanket cylinder.

To circumvent the cumbersome photographic development, plate-mounting, and plate-registration operations that typify traditional printing technologies, practitioners have developed electronic alternatives that store the imagewise pattern in digital form and impress the pattern directly onto the plate. Plate-imaging devices amenable to computer control include various forms of lasers.

Current laser-based lithographic systems frequently rely on removal of an energy-absorbing layer from the lithographic plate to create an image. Exposure to laser radiation may, for example, cause ablation—i.e., catastrophic overheating—of the ablated layer in order to facilitate its removal. Because ablation produces airborne debris, ablation-type plates must be designed with imaging byproducts in mind; for example, the plate may be designed so as to trap ablation debris between layers, at least one of which is not removed until after imaging is complete.

Dry plates, which utilize an oleophobic topmost layer of fluoropolymer or, more commonly, silicone (polydiorganosiloxane), exhibit excellent debris-trapping properties because the topmost layer is tough and rubbery; ablation debris generated thereunder remains confined as the silicone or fluoropolymer does not itself ablate. Where imaged, the underlying layer is destroyed or de-anchored from the topmost layer. A common three-layer plate, for example, is made ready for press use by image-wise exposure to imaging (e.g., infrared or "IR") radiation that causes ablation of all or part of the central layer, leaving the topmost layer de-anchored in the exposed areas. Subsequently, the de-anchored overlying layer and the central layer are removed (at least partially) by a post-imaging cleaning process—e.g., rubbing of the plate with or without a cleaning liquid—to reveal the third layer (typically an oleophilic polymer, such as polyester).

Silicone polymers are based on the repeating diorganosiloxane unit $(R_2SiO)_n$, where R is an organic radical or hydrogen and n denotes the number of units in the polymer chain. Fluorosilicone polymers are a particular type of silicone polymer wherein at least a portion of the R groups contain one or more fluorine atoms. The physical properties of a particular silicone polymer depend upon the length of its polymer chain, the nature of its R groups, and the terminal groups on the end of its polymer chain. Any suitable silicone polymer known in the art may be incorporated into or used for the surface layer.

Silicone polymers are typically prepared by cross-linking (or "curing") diorganosiloxane units to form polymer chains. The resulting silicone polymers can be linear or branched. A number of curing techniques are well known in the art, including condensation curing, addition curing, moisture curing. In addition, silicone polymers can include one or more additives, such as adhesion modifiers, rheology modifiers, colorants, and radiation-absorbing pigments, for example. Other options include silicone acrylate monomers, i.e., modified silicone molecules that incorporate "free radical" reactive acrylate groups or "cationic acid" reactive epoxy groups along and/or at the ends of the silicone polymer backbone. These are cured by exposure to UV and electron radiation (i.e., electron beam, hereafter "EB") sources. This type of silicone polymer can also include additives such as adhesion promoters, acrylate diluents, and multifunctional acrylate monomer to promote abrasion resistance, for example.

Silicone acrylates represent an advantageous polymer system in that, for example, no organic solvent is required in their preparation or use. A methyl (Me) substituted, acrylate-modified polydimethylsiloxane acrylate has structure:

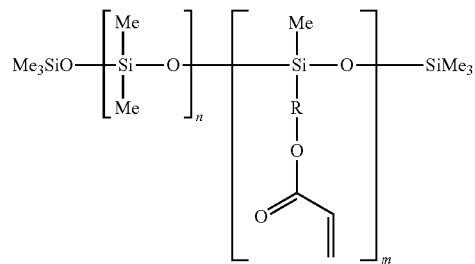

A disadvantage of silicone acrylates, however, is the typical necessity to eliminate oxygen from the reaction environment (e.g., by use of an inert gas, such as nitrogen, to displace it). This is because oxygen, found in the silicone and air, scavenges radicals very effectively, thereby inhibiting polymerization of the acrylates. In order to obtain an acceptable curing quality, it is necessary to reduce the oxygen content of the air from 210,000 ppm to less than 100 ppm (more typically less than 50 ppm) in the coating unit. To date, escape from this constraint while maintaining adequate cure properties has required the use of additives such as trivalent phosphites.

Unfortunately, not only do these measures ("inertization" of the coating unit or the use of specialized additives) increase cost, but cross-linking acrylate silicones under very low oxygen conditions can result in dry printing plates having an unacceptable tendency to "tone" on press—i.e., the non-image portions of the plate surface fail to fully reject ink. As a result, the final work product exhibits a "dirty" appearance with unwanted ink contaminating non-image areas.

SUMMARY OF THE INVENTION

It has been found, surprisingly, that curing silicone acrylates at high oxygen levels not only substantially reduces or eliminates toning, but does not affect plate durability or printing performance. In particular, curing at high oxygen levels (i.e., levels above 100 ppm, and in some embodiments, above 200 ppm) results in fully cured dry printing plates that do not exhibit toning when used to print. At high oxygen levels, high EB doses of ~14 MRad are preferred, although lower levels (e.g., 7 MRad) are feasible. The term "dose" refers to the absorbed dose, i.e., the amount of energy deposited into a specified mass of material. A common unit of absorbed dose is the kilogray (kGy), defined as the number of joules (J) of energy deposited into one kilogram (kg) of matter. One megarad (MRad) is equal to 10 kGy, or 10 kJ/kg. At a fixed electron accelerating voltage, the dose is directly proportional to the electron beam current.

Accordingly, in a first aspect, the invention relates to a method of making an ablation-type printing member. Embodiments of the method comprise the steps of providing a precursor structure having an oleophilic surface; coating a silicone acrylate over the precursor; and following the coating step, curing the silicone acrylate by EB exposure at an ambient oxygen level of at least 100 ppm. In some embodiments the the ambient oxygen level is at least 200 ppm, although it may be at least 300 ppm or even 1000 ppm or more.

In various embodiments, the EB exposure involves a delivered dose of more than 2 MRad, although it may be at least 7 or even 14 or more MRad.

The precursor may comprise an ablation-resistant, oleophilic substrate and an ablatable imaging layer thereover, and the silicone acrylate may be an acrylate-modified polydimethylsiloxane polymer.

In another aspect, the invention relates to an ablation-type printing member comprising an ablation-resistant oleophilic layer; above the oleophilic layer, an ablatable imaging layer; and above the imaging layer, a silicone acrylate layer that has been cured by electron-beam exposure at an ambient oxygen level of at least 100 ppm. The silicone acrylate may be an acrylate-modified polydimethylsiloxane polymer.

It should be stressed that, as used herein, the term "plate" or "member" refers to any type of printing member or surface capable of recording an image defined by regions exhibiting differential affinities for ink and/or fountain solution. Suitable configurations include the traditional planar or curved lithographic plates that are mounted on the plate cylinder of a printing press, but can also include seamless cylinders (e.g., the roll surface of a plate cylinder), an endless belt, or other arrangement.

"Ablation" of a layer means either rapid phase transformation (e.g., vaporization) or catastrophic thermal overload, resulting in uniform layer decomposition. Typically, decomposition products are primarily gaseous. Optimal ablation involves substantially complete thermal decomposition (or pyrolysis) with limited melting or formation of solid decomposition products.

The term "substantially" means ±10% (e.g., by weight or by volume), and in some embodiments, ±5%. The term "consists essentially of" means excluding other materials that contribute to function.

DESCRIPTION OF DRAWINGS

In the following description, various embodiments of the present invention are described with reference to the single FIGURE of the drawing, which shows an enlarged cross-sectional view of a printing member according to the invention.

DETAILED DESCRIPTION

1. Printing Plates

FIG. 1 illustrates a negative-working printing member 100 according to the present invention that includes a substrate 102, an imaging layer 104, and a topmost layer 106. Layer 104 is sensitive to imaging (generally IR) radiation as discussed below, and imaging of the printing member 100 (by exposure to IR radiation) results in imagewise ablation of the layer 104. The resulting de-anchorage of topmost silicone acrylate layer 106 facilitates its removal by rubbing or simply as a result of contact during the print "make ready" process. Preferably, the ablation debris of layer 104 is chemically compatible with water in the sense of being acted upon, and removed by, an aqueous liquid following imaging.

Substrate 102 (or a layer thereover) exhibits a lithographic affinity opposite that of silicone acrylate layer 106. Consequently, ablation of layer 104, followed by imagewise removal of the layer 106 to reveal an underlying layer or the substrate 102, results in a lithographic image.

Most of the films used in the present invention are "continuous" in the sense that the underlying surface is completely covered with a uniform layer of the deposited material.

Each of these layers and their functions is described in detail below.

1.1 Substrate 102

The substrate provides dimensionally stable mechanical support to the printing member. The substrate should be strong, stable, and flexible. One or more surfaces (and, in some cases, bulk components) of the substrate may be hydrophilic. The topmost surface, however, is generally oleophilic. Suitable materials include, but are not limited to, polymers, metals and paper, but generally, it is preferred to have a polymeric ink-accepting layer (e.g., applied over a metal or paper support). As used herein, the term "substrate" refers generically to the ink-accepting layer beneath the radiation-sensitive layer 104, although the substrate may, in fact, include multiple layers (e.g., an oleophilic film laminated to an optional metal support 110, such as an aluminum sheet having a thickness of at least 0.001 inch, or an oleophilic coating over an optional paper support).

Substrate 102 desirably also exhibits high scattering with respect to imaging radiation. This allows full utilization of the radiation transmitted through overlying layers, as the scattering causes back-reflection into layer 104 and consequent increases in thermal efficiency.

Polymers suitable for use in substrates according to the invention include, but are not limited to, polyesters (e.g., polyethylene terephthalate and polyethylene naphthalate), polycarbonates, polyurethane, acrylic polymers, polyamide polymers, phenolic polymers, polysulfones, polystyrene, and cellulose acetate. A preferred polymeric substrate is polyethylene terephthalate film, such as the polyester films available from DuPont-Teijin Films, Hopewell, Va. under the trademarks MYLAR and MELINEX, for example. Also suitable are the white polyester products from DuPont-Teijin such as MELINEX 927W, 928W 329, 329S, 331.

Polymeric substrates can be coated with a hard polymer transition layer to improve the mechanical strength and durability of the substrate and/or to alter the hydrophilicity or oleophilicity of the surface of the substrate. Ultraviolet- or EB-cured acrylate coatings, for example, are suitable for this purpose. Polymeric substrates can have thicknesses ranging from about 50 µm to about 500 µm or more, depending on the specific printing member application. For printing members in the form of rolls, thicknesses of about 200 µm are preferred. For printing members that include transition layers, polymer substrates having thicknesses of about 50 µm to about 100 µm are preferred.

1.2 Layer 104

The layer 104 can consist of a polymeric system that intrinsically absorbs in the near-IR region, or a polymeric coating into which near-IR-absorbing components have been dispersed or dissolved. Alternatively, layer 104 can be a metal layer thin enough to support imaging by absorbing, rather than reflecting, IR radiation. To perform an absorptive function, a metal layer 104 should transmit as much as 70% (and at least 5%) of the IR radiation incident thereon; if transmission is insufficient, the layer will reflect radiation rather than absorbing it, while excessive transmission levels appear to be associated with insufficient absorption. Suitable metal layers are typically on the order of 100 Å in thickness, and may include or consist essentially of aluminum, titanium, nickel, iron and chromium (or combinations thereof).

In polymeric embodiments, layer 104 can be any polymer capable of stably retaining, at the applied thickness, an IR-absorptive pigment dispersion (generally nonconductive carbon black) adequate to cause ablation of the layer in response to an imaging pulse; and of exhibiting water compatibility following ablation. Furthermore, in embodiments where layer 104 is only partially ablated, it is either (a) sufficiently water-compatible to be fully removed during cleaning, or (b) oleophilic if some of layer remains even after cleaning. It is found that the nonconductive carbon black enhances, or even confers, the desired water compatibility of layer 104 or the ablation debris thereof. Layer 104 should exhibit good adhesion to the overlying layer 206, and resistance to age-related degradation may also be considered.

In general, pigment loading levels are at least 25 wt %, and the coating is applied at a dry weight of at least $0.2 \text{ g/m}^2$, or at least $0.4 \text{ g/m}^2$, or at least $0.8 \text{ g/m}^2$, or at least $1.0 \text{ g/m}^2$, or in some embodiments, at least $1.5 \text{ g/m}^2$. Representative materials include BAKELITE (phenol formaldehyde) and other phenolic resins, vinyl chloride resins, acrylic resins, and/or polyvinyl butyral.

Other suitable materials include polymers formed from maleic anhydride and one or more styrenic monomers (that is, styrene and styrene derivatives having various substituents on the benzene ring), polymers formed from methyl methacrylate and one or more carboxy-containing monomers, and mixtures thereof. These polymers can comprise recurring units derived from the noted monomers as well as recurring units derived from additional, but optional, monomers (e.g., (meth)acrylates, (meth)acrylonitrile and (meth)acrylamides). The carboxy-containing recurring units can be derived, for example, from acrylic acid, methacrylic acid, itaconic acid, maleic acid, and similar monomers known in the art. Other suitable materials include polymer binders having pendant epoxy groups. Particularly useful polymers of this type have pendant epoxy groups attached to the polymer backbone through a carboxylic acid ester group such as a substituted or unsubstituted —C(O)O-alkylene, —C(O)O-alkylene-phenylene-, or —C(O)O-phenylene group wherein the alkylene has 1 to 4 carbon atoms. Preferred ethylenically unsaturated polymerizable monomers having pendant epoxy groups useful to make these polymer binders include glycidyl acrylate, glycidyl methacrylate, 3,4-epoxycyclohexyl methacrylate, and 3,4-epoxycyclohexyl acrylate. The epoxy-containing polymers can also comprise recurring units derived from one or more ethylenically unsaturated polymerizable monomers that do not have pendant epoxy groups including but not limited to, (meth)acrylates, (meth)acrylamides, vinyl ether, vinyl esters, vinyl ketones, olefins, unsaturated imides (such as maleimide), N-vinyl pyrrolidones, N-vinyl carbazole, vinyl pyridines, (meth)acrylonitriles, and styrenic monomers. Of these, the (meth)acrylates, (meth)acrylamides, and styrenic monomers are preferred and the styrenic monomers are most preferred. For example, a styrenic monomer could be used in combination with methacrylamide, acrylonitrile, maleimide, vinyl acetate, or N-vinyl pyrrolidone.

Still other useful materials include polyvinyl acetals, (meth)acrylic resins comprising carboxy groups, vinyl acetate crotonate-vinyl neodecanoate copolymer phenolic resins, maleated wood rosins, styrene-maleic anhydride copolymers, (meth)acrylamide polymers, polymers derived from an N-substituted cyclic imide, and combinations thereof. Particularly useful materials include polyvinyl acetals, and copolymers derived from an N-substituted cyclic imide (especially N-phenylmaleimide), a (meth)acrylamide (especially methacrylamide), and a (meth)acrylic acid (especially methacrylic acid). The preferred polymeric materials of this type are copolymers that comprise from about 20 to about 75 mol % and preferably about 35 to about 60 mol % of recurring units derived from N-phenylmaleimide, N-cyclohexylmaleimide, N-benzylmaleimide, or a mixture thereof; from about 10 to about 50 mol % and preferably from about 15 to about 40 mol % of recurring units derived from acrylamide, methacrylamide, or a mixture thereof; and from about 5 to about 30 mol % and preferably about 10 to about 30 mol % of recurring units derived from methacrylic acid. Other hydrophilic monomers, such as hydroxyethyl methacrylate, may be used in place of some or all of the methacrylamide. Other alkaline-soluble monomers, such as acrylic acid, may be used in place of some or all of the methacrylic acid.

Further suitable polymeric materials include resins having activated methylol and/or activated alkylated methylol groups. Such resins include, for example, resole resins and their alkylated analogs, methylol melamine resins and their alkylated analogs (e.g., melamine-formaldehyde resins), methylol glycoluril resins and alkylated analogs (e.g., glycoluril-formaldehyde resins), thiourea-formaldehyde resins, guanamine-formaldehyde resins, and benzoguanamine-formaldehyde resins. Commercially available melamine-formaldehyde resins and glycoluril-formaldehyde resins include, for example, CYMEL resins (Dyno Cyanamid) and NIKALAC resins (Sanwa Chemical). The resin having activated methylol and/or activated alkylated methylol groups is preferably a resole resin or a mixture of resole resins. Resole resins are well known to those skilled in the art. They are prepared by reaction of a phenol with an aldehyde under basic conditions using an excess of phenol. Commercially available resole resins include, for example, GP649D99 resole (Georgia Pacific).

1.3 Silicone Acrylate Layer 106

The topmost layer participates in printing and provides the requisite lithographic affinity difference with respect to substrate 102; in particular, layer 106 is oleophobic and suitable for dry printing. In addition, the topmost layer 106 may help to control the imaging process by modifying the heat dissipation characteristics of the printing member at the air-imaging layer interface. Silicone acrylate layer 106 is substantially (i.e., >90%) transparent to imaging radiation.

Silicone acrylates for topmost layer 106 are typically applied between 0.05 and 2.5 g/m² using coating techniques known in the art, such as wire-wound rod coating, reverse roll coating, gravure coating, or slot die coating. For example, in particular embodiments, the topmost layer is applied using a wire-round rod, followed by drying in a convection oven. In various embodiments, the topmost layer is applied between 0.2 and 2.5 g/m², e.g., 1.0 to 2.0 g/m². In one embodiment, the topmost layer is applied between 0.2 and 0.9 g/m² to create a process-free printing member. Applications from 1.0 to 2.5 g/m² create a more durable printing member, but these generally require a mild processing such as water rinse and wipe prior to press use.

Silicone acrylate coatings applied as described above are cured at high oxygen levels, as detailed in the examples below.

2. Imaging of Printing Plates

Imaging of the printing member 100 may take place directly on a press, or on a platemaker. In general, the imaging apparatus will include at least one laser device that emits in the region of maximum plate responsiveness, i.e., whose $\lambda_{max}$ closely approximates the wavelength region where the plate absorbs most strongly. Specifications for lasers that emit in the near-IR region are fully described in U.S. Pat. Nos. Re. 33,512 ("the '512 patent") and 5,385,092 ("the '092 patent"), the entire disclosures of which are hereby incorporated by reference. Lasers emitting in other regions of the electromagnetic spectrum are well-known to those skilled in the art.

Suitable imaging configurations are also set forth in detail in the '512 and '092 patents. Briefly, laser output can be provided directly to the plate surface via lenses or other beam-guiding components, or transmitted to the surface of a blank printing plate from a remotely sited laser using a fiber-optic cable. A controller and associated positioning hardware maintain the beam output at a precise orientation with respect to the plate surface, scan the output over the surface, and activate the laser at positions adjacent selected points or areas of the plate. The controller responds to incoming image signals corresponding to the original document or picture being copied onto the plate to produce a precise negative or positive image of that original. The image signals are stored as a bitmap data file on a computer. Such files may be generated by a raster image processor ("RIP") or other suitable means. For example, a RIP can accept input data in page-description language, which defines all of the features required to be transferred onto the printing plate, or as a combination of page-description language and one or more image data files. The bitmaps are constructed to define the hue of the color as well as screen frequencies and angles.

Other imaging systems, such as those involving light valving and similar arrangements, can also be employed; see, e.g., U.S. Pat. Nos. 4,577,932; 5,517,359; 5,802,034; and 5,861,992, the entire disclosures of which are hereby incorporated by reference. Moreover, it should also be noted that image dots may be applied in an adjacent or in an overlapping fashion.

The imaging apparatus can operate on its own, functioning solely as a platemaker, or can be incorporated directly into a lithographic printing press. In the latter case, printing may commence immediately after cleaning as described herein. The imaging apparatus can be configured as a flatbed recorder or as a drum recorder, with the lithographic plate blank mounted to the interior or exterior cylindrical surface of the drum. Obviously, the exterior drum design is more appropriate to use in situ, on a lithographic press, in which case the print cylinder itself constitutes the drum component of the recorder or plotter.

In the drum configuration, the requisite relative motion between the laser beam and the plate is achieved by rotating the drum (and the plate mounted thereon) about its axis and moving the beam parallel to the rotation axis, thereby scanning the plate circumferentially so the image "grows" in the axial direction. Alternatively, the beam can move parallel to the drum axis and, after each pass across the plate, increment angularly so that the image on the plate "grows" circumferentially. In both cases, after a complete scan by the beam, an image corresponding (positively or negatively) to the original document or picture will have been applied to the surface of the plate. In the flatbed configuration, the beam is drawn across either axis of the plate, and is indexed along the other axis after each pass. Of course, the requisite relative motion between the beam and the plate may be produced by movement of the plate rather than (or in addition to) movement of the beam.

Examples of useful imaging devices include models of the MAGNUS and TRENDSETTER imagesetters (available from Eastman Kodak Company) that utilize laser diodes emitting near-IR radiation at a wavelength of about 830 nm. Other suitable exposure units include the CRESCENT 42T Platesetter (operating at a wavelength of 1064 nm, available from Gerber Scientific, Chicago, Ill.) and the SCREEN PLATERITE 4300 series or 8600 series plate-setter (available from Screen, Chicago, Ill.).

EXAMPLES

Examples 1-3

Waterless printing plates were made by applying a metal IR-ablatable imaging layer to a polyester substrate, and coating an oleophobic silicone acrylate layer onto the imaging layer. A preferred substrate is a 175 μm white polyester film sold by Dupont Teijin Films (Hopewell, Va.) under the name MELINEX 927W.

The polyester substrate was first coated with a bimetal Al/Sn radiation-responsive layer deposited by a DC magnetron sputtering source using ultrahigh-purity argon as the sputtering gas. Suitable bimetal imaging layers and deposition procedures are described, for example, in copending U.S. application Ser. No. 12/405,732 (with particular reference to Example 1), filed on Mar. 17, 2009; the entirety of this document is hereby incorporated by reference.

The imaging layer was subsequently coated with a 100% solids UV/EB-curable formulation based on acrylate-modified silicone copolymer technology, supplied by Bluestar Silicones (East Brunswick, N.J.) under the name SIL-COLEASE. A suitable formulation for the topmost oleophobic layer of the printing member is:

| Formula A | |
|---|---|
| Components | Parts |
| Silcolease PC 900 | 0.60 |
| Silcolease PC970 | 0.28 |
| Silcolease PC951 | 0.10 |
| CD9051 | 0.02 |

The SILCOLEASE PC900 and PC970 are acrylate-modified polydimethylsiloxane polymers that differ in the degree of reactive acrylate functionality (methyl-to-acrylate ratios) and their polymer chain lengths. The SILCOLEASE PC900 is a silicone polymer with a low methyl-to-acrylate ratio that imparts basic properties to the coatings such as curing speed, mechanical properties, and adhesion to the underlying substrate. The SILCOLEASE PC970 has a high methyl-to-acrylate ratio and it is recommended as a "low release modifier" in release-coating applications. The higher percentage of methyl groups yields more silicone-like surfaces after curing. The SILCOLEASE PC951 is an extender of proprietary composition supplied by Bluestar Silicones and specifically developed for use with the SILCOLEASE PC900 system. SILCOLEASE PC951 is a mixture of multifunctional acrylate monomers compatible with the silicone chemistry and is added to modify properties such as viscosity, hardness, and chemical resistance. The CD9051 is a trifunctional acid ester manufactured by Sartomer Company Inc. (Exton, Pa.) which promotes strong adhesion to the bimetal imaging layer used in the present application.

The silicone acrylate formulations were applied to the imaging layer using an offset gravure coating system operated in the forward mode. The system was equipped with a polyurethane applicator roll of 85 Shore A hardness and a 5.5 BCM QCH gravure cylinder. The coatings were EB-cured on an EB processing system (ELECTROCURE series) manufactured by Energy Sciences Inc. (Wilmington, Mass.). The EB chamber was inerted with nitrogen generated via vaporization of liquid nitrogen and supplied into the curing chamber by a nitrogen knife. The latter directed a continuous high nitrogen flow onto the web to efficiently strip off the boundary oxygen layer. The oxygen concentration in the chamber was monitored with an oxygen analyzer and oxygen concentrations were varied by regulating the nitrogen flow delivered into the EB chamber.

The coating equipment was operated at a line speed of 7 m/min and the gravure to line speed ratio was set up to produce silicone coatings of about 2.0 g/m². Samples were cured using various e-beam doses and in the presence of variable nitrogen flows as noted below.

EB cured silicone coatings were made with Formula A and curing at the following conditions:

|  | Example 1 | Example 2 | Example 3 |
| --- | --- | --- | --- |
| EB Dose (MRad) | 14 | 14 | 7 |
| Oxygen (ppm) | 200-300 | <50 | <50 |

Examples 2 and 3 are comparative examples.

The plates were imaged on a Presstek DIMENSION 425 platesetter at a power of 300 mJ/cm² and manually cleaned to remove the loosened silicone debris left on the plate after imaging. The cleaning was performed in two steps: first, the surface was dry-rubbed with a cotton towel, and then the surface was wet-rubbed with a cotton towel saturated with isopropanol.

The cleaned plates were run on a GTO Heidelberg press using black ink (Aqualess Ultra Black MZ waterless ink, Toyo Ink America LLC, Addison, Ill.) and uncoated stock (Williamsburg Plus Offset Smooth, 60 lb white, item number 05327, International Paper, Memphis, Tenn.). Under these conditions the printing member of Example 1, with a silicone layer cured in the presence of high oxygen levels, produced prints with clean background (i.e., free of toning) for 1,000 impressions. Examples 2 and 3, which utilized silicone layers cured in the presence of very low oxygen levels, displayed poor ink-rejection performance, yielding prints that show excessive toning from the start of the press test.

Examples 4-7

In the following examples the Al/Sn metalized polyester was coated with a silicone acrylate layer of the following composition:

| Formula B | |
| --- | --- |
| Components | Parts |
| Silcolease PC 900 | 0.33 |
| Silcolease PC970 | 0.36 |
| Silcolease PC951 | 0.29 |
| CD9051 | 0.02 |

Coatings were applied on the same equipment described in previous examples using the following conditions in the curing chamber:

|  | Example 4 | Example 5 | Example 6 | Example 7 |
| --- | --- | --- | --- | --- |
| EB Dose (Mrad) | 14 | 14 | 14 | 14 |
| Oxygen (ppm) | 2,000-3,000 | 800-1,000 | 200-300 | <50 |

Example 7 is a comparative example.

The plates were imaged on a DIMENSION 425 plate setter at a power of 300 mJ/cm² and manually cleaned, as described above, to remove the loosened silicone debris left on the plate after imaging. The cleaned plates were run on a GTO Heidelberg press using black ink and uncoated stock, as above. Under these conditions, the printing members of Examples 4-6 made with a silicone acrylate layer cured in the presence of high oxygen levels yielded prints free of toning for 500 impressions. The plate of Example 7 showed toning from the start of the press work.

Examples 8-10

The Al/Sn metalized polyester was coated with a silicone acrylate of about 2.0 g/m² coat weight using a formulation of the following composition:

| Formula C | |
| --- | --- |
| Components | Parts |
| Silcolease PC 900 | 0.62 |
| Silcolease PC970 | 0.25 |
| SR9003 | 0.08 |
| CD9051 | 0.05 |

SR9003 is a difunctional acrylate monomer, propoxylated neopentyl glycol diacrylate, supplied by Sartomer Company, Inc. (Exton, Pa.), which provides properties such as viscosity and shrinkage reduction.

The silicone acrylate coatings were applied on the equipment described above using the following conditions in the curing chamber:

|  | Example 8 | Example 9 | Example 10 |
|---|---|---|---|
| EB Dose (MRad) | 14 | 12 | 2 |
| Oxygen (ppm) | 1,200-1,500 | 1,200-1,500 | <50 |

Example 10 is a comparative example.

The plates were imaged on a DIMENSION 425 plate setter at a power of 300 mJ/cm² and manually cleaned, as described above, to remove the loosened silicone debris left on the plate after imaging.

The cleaned plates were run on a GTO Heidelberg press using black ink and uncoated stock, as above. Under these conditions, the printing members of Examples 8 and 9, made with silicone acrylates cured in the presence of high oxygen levels, yielded prints free of toning for 200 impressions. The plate member of Example 10 showed toning from the start of the press work.

Examples 11 and 12

The Al/Sn metalized polyester was coated with a silicone coating of about 2.0 g/m² based on the following formulation:

| Formula D | |
|---|---|
| Components | Parts |
| Silcolease PC 900 | 0.57 |
| Silcolease PC970 | 0.28 |
| Miramer M4004 | 0.10 |
| CD9051 | 0.05 |

Miramer M4004 is a tetrafunctional monomer acrylate, pentaerythritol ethoxylated tetracrylate, supplied by Rahn USA Corporation (Aurora, Ill.). This additive is added to the formulation to modify properties such as viscosity, hardness, and abrasion resistance of the silicone coatings.

The silicone acrylate coatings were applied on the equipment described above using the following conditions in the curing chamber:

|  | Example 11 | Example 12 |
|---|---|---|
| EB Dose (MRad) | 14 | 7 |
| Oxygen (ppm) | 350-400 | 150-250 |

The cleaned plates were run on a GTO Heidelberg press using black ink and uncoated stock, as above. Under these conditions, the printing members made with silicone cured in the presence of high oxygen levels (i.e., Examples 11 and 12) produced prints free of toning for more than 200 impressions.

Although the present invention has been described with reference to specific details, it is not intended that such details should be regarded as limitations upon the scope of the invention, except as and to the extent that they are included in the accompanying claims.

What is claimed is:

1. A method of printing comprising:
   a. providing a printing member fabricated according to steps comprising (i) providing a precursor structure having an oleophilic surface; (ii) coating a silicone acrylate over the precursor, the silicone acrylate not including a trivalent phosphite additive; and (iii) following step (a)(ii), curing the silicone acrylate by electron-beam exposure at an ambient oxygen level of at least 100 ppm;
   b. following the curing step, selectively exposing, in a pattern representing an image, the printing member to imaging radiation so as to remove or render removable selected portions of the silicone acrylate layer;
   c. cleaning the printing member to remove the silicone acrylate layer where the printing member has been exposed to imaging radiation, thereby directly producing an array of oleophilic image features separated by remaining portions of the silicone acrylate layer; and
   d. repeatedly (i) applying ink to the printing member, and (ii) transferring the ink to a recording medium,
   wherein the ink is transferred, substantially without toning, only from the oleophilic image features and not from portions of the printing member therebetween.

2. The method of claim 1, wherein the ambient oxygen level is at least 200 ppm.

3. The method of claim 1, wherein the electron-beam exposure delivers a dose of at more than 2 MRad.

4. The method of claim 1, wherein the electron-beam exposure delivers a dose of at least 7 MRad.

5. The method of claim 1, wherein the electron-beam exposure delivers a dose of at least 14 MRad.

6. The method of claim 1, wherein the precursor comprises an ablation-resistant, oleophilic substrate and an ablatable imaging layer thereover.

7. The method of claim 1, wherein the silicone acrylate consists of an acrylate-modified polydimethylsiloxane polymer.

* * * * *